Oct. 27, 1964   E. LE VESCONTE   3,154,215
DENESTABLE STACK OF FROZEN FOOD CONTAINERS
Filed Aug. 25, 1960   2 Sheets-Sheet 1
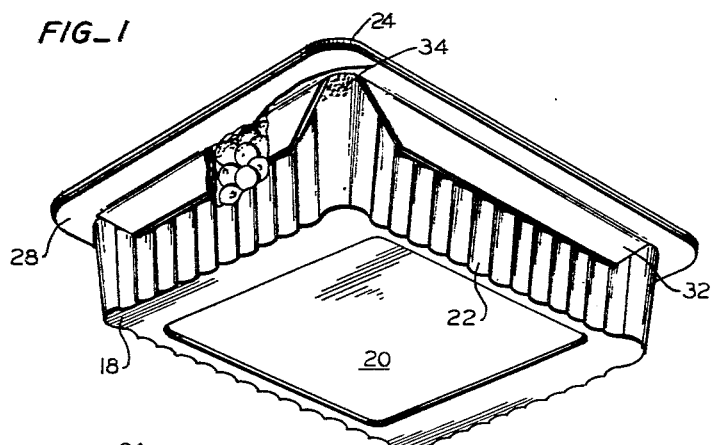
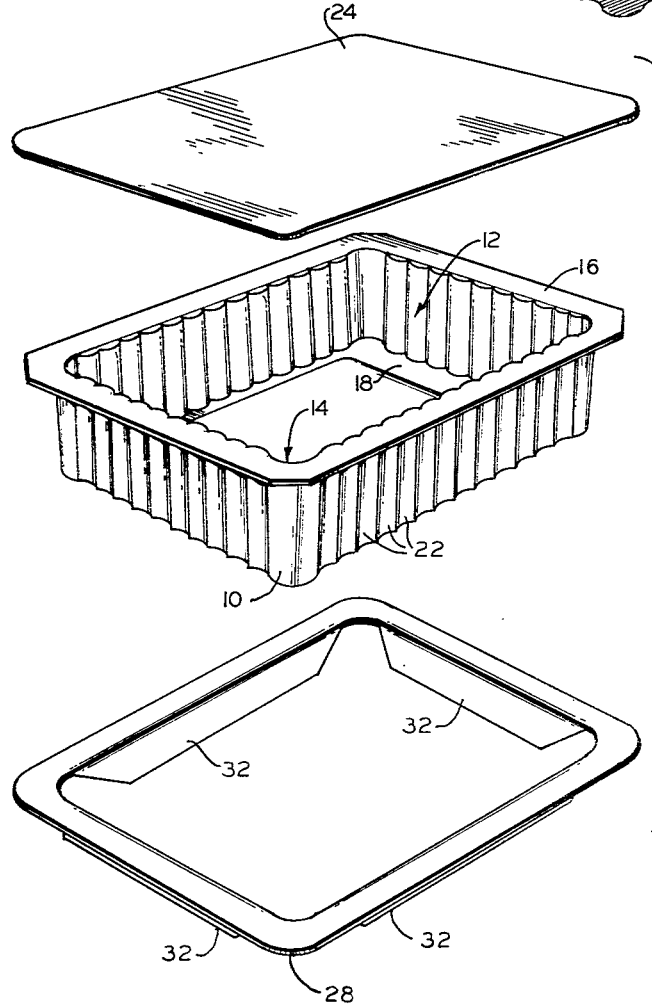
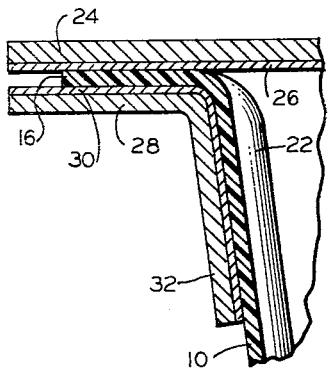
INVENTOR.
ED LE VESCONTE
BY
*Naylor & Neal*
ATTORNEYS

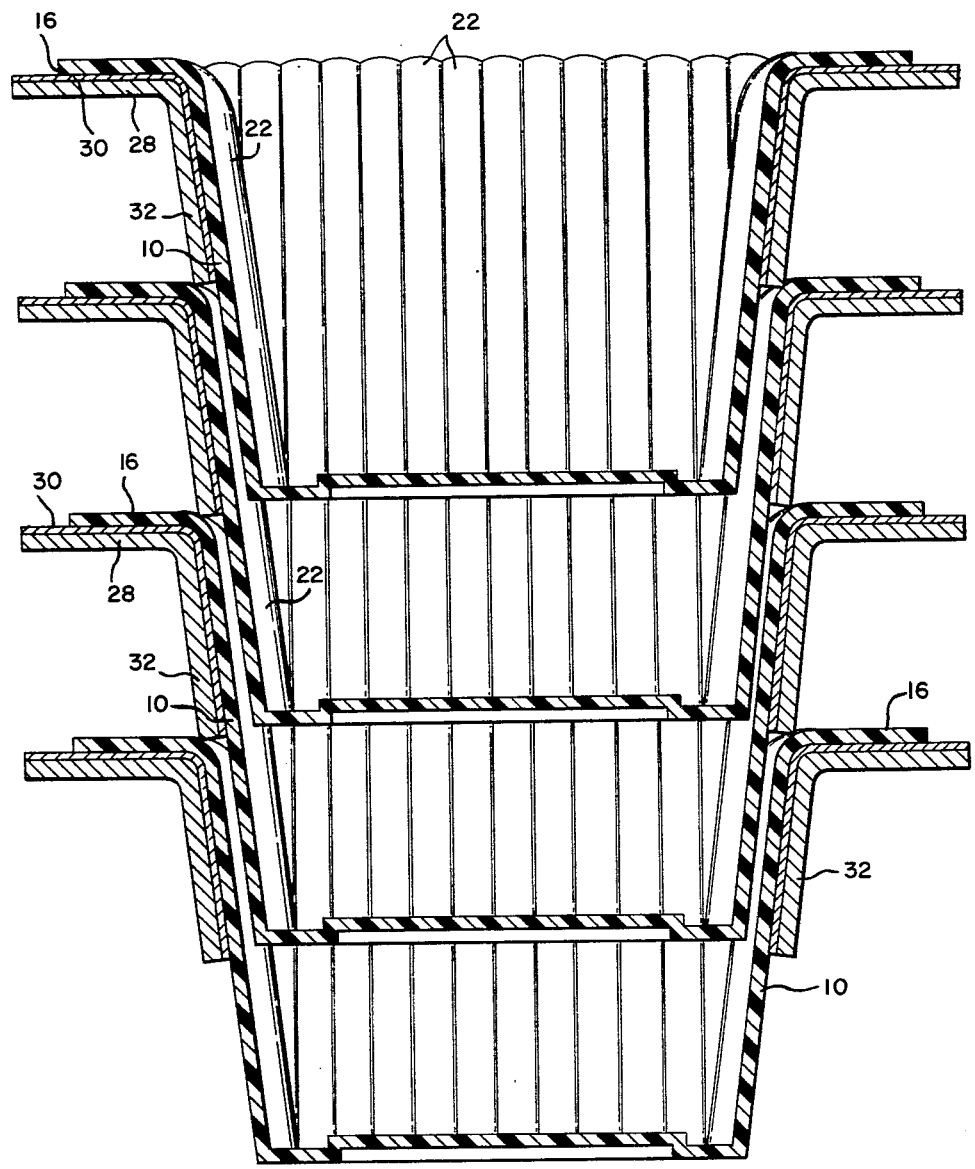
FIG_4

United States Patent Office 3,154,215
Patented Oct. 27, 1964

3,154,215
DENESTABLE STACK OF FROZEN
FOOD CONTAINERS
Ed Le Vesconte, Redwood City, Calif., assignor to H. S. Crocker Co., Inc., San Bruno, Calif., a corporation of California
Filed Aug. 25, 1960, Ser. No. 51,806
2 Claims. (Cl. 220—97)

This invention relates to frozen food containers and to an attachment for frozen food containers by which they may be more salable.

It is a principal object of this invention to provide a frozen food container in which the contents of the container are pleasingly displayed on the grocer's shelf.

It is another object of this invention to provide such a frozen food container which is simple to manufacture, simple to fill and assemble, and very rigid and durable.

It is another object of the invention to provide a frozen food container in which the majority of the wall portions of the container are constructed of a transparent material whereby the contents of the frozen food in the container may be viewed in the grocery store.

It is another object of this invention to provide means for hermetically sealing a frozen food container very simply and efficiently.

It is another object of the invention to provide a partially assembled frozen food container which may be sold to frozen food packaging concerns and filled and sealed with a minimum of difficulty and expensive equipment.

It is a more specific object of this invention to provide a frozen food container in which the majority of the wall portions of the container are constructed of a transparent material by which the contents of the container may be viewed and in which the container is provided with means whereby the viewer of the container cannot see unsightly frost on the frozen food in the container.

Other objects and advantages of the present invention will become apparent from the following description read in conjunction with the attached drawings in which:

FIG. 1 is a perspective view of a container constructed in accordance with this invention and containing a frozen vegetable;

FIG. 2 is an exploded view of the components of the container of FIG. 1;

FIG. 3 is a cross-sectional view of an edge portion of the container of FIG. 1 prior to sealing of the container, and FIG. 4 is a cross sectional view of a nested stack of the containers.

Referring now in detail to the drawings, the container illustrated therein comprises a body 10 made of a transparent plastic material such as polystyrene and defining a cavity 12 therein. The cavity 12 is surrounded by a mouth indicated generally at 14, the mouth being surrounded by an outwardly extending flange 16. The bottom 18 of the body 10 is generally rectangular in shape and provided with an indented center portion 20 (see FIG. 1). The side walls of the container are provided with a plurality of parallel grooves 22 extending from the bottom 18 to the flange 16. The curved portions of the body 10 at the edge of the indentations 20 and the boundaries between the grooves 22 lend substantial rigidity to the body 10.

A lid 24 is provided on the top of the container covering the mouth 14 and overlaying the flange 16; the lid 24 (as illustrated in FIG. 3) extends a short distance beyond the outer edge of the flange 16. The surface of the lid 24 adjacent to the body 10 is provided with a continuous coating 26 of a thermoplastic material such as polyethylene which renders the lid 24 impervious to moisture and provides means for heat sealing the lid 24 to the flange 16 of the body 10.

A retaining ring 28 surrounds the body 10 and underlies the flange 16. The surface of the retaining ring 28 adjacent to the flange 16 is provided with a coating 30 of thermoplastic material such as polyethylene by which the retaining ring 28 may be attached to the flange 16. It should be noted that the outer periphery of the retaining ring 28 extends beyond the edge of the flange 16 and in general alignment with the periphery of the lid 24 whereby heat sealing of the ring 28 and lid 24 to the flange 16 effects heat sealing of the outer peripheries of the ring 28 and lid 24 to each other.

The ring 28 is provided with a plurality of internal downwardly extending flaps 32 which overlie portions of the sidewalls of the container 10 and, when the package is assembled as illustrated in FIG. 1, obscures the majority of the frost 34 in the container adjacent to the mouth thereof. It should be noted that since the flaps 32 overlie scalloped portions of the sidewalls of the body 10, they are not efficiently sealed to such sidewalls and may be readily pulled from the sidewalls to facilitate unsealing of the container.

It should be noted that the retaining ring 28 together with the frost masking flaps 32 carried thereby provide for the first time a practical and salable transparent container for frozen foods since prior attempts at the production of transparent containers for frozen foods have resulted in unsightly articles of commerce in which objectionable looking frost was visible through the package. Accordingly, the retaining ring 28 with the masking flaps 32 thereon is a salable article of commerce in itself since it may be attached to already filled and sealed containers of frozen foods. However, the frozen food container of this invention is most useful to the packer of frozen foods when he is able to purchase it as a combination of the transparent body 10 with the retainer ring 28 attached to the flange thereof since the food packer is then able to assemble and seal the carton with inexpensive heat sealing equipment.

The attachment of the ring with its flaps thereon prior to shipment to the packer also permits more rapid handling of nested stacks of the empty containers since the flaps, when separating two containers in a stack prevent the formation of vacuums in the containers with attendant difficulties in separating them and placing them on a conveyor. The ring also gives light weight plastic bodies sufficient weight and rigidity to be handled by conventional carton filling equipment.

The use of the cooperating ring and lid on the assembled container, especially when they are made of relatively heavy paperboard or the like, also produces a flange on the container which is rigid and not easily damaged by normal handling.

Obviously many modifications in the construction and design of the frozen food container and frost masking devices of this invention may be made without departing from the spirit and scope of the invention.

What is claimed is:

1. An easily denestable stack of containers with each container comprising a generally rectangular body made of a plastic material defining a cavity therein for the receipt of food with a generally rectangular mouth surrounded by an outwardly extending flange and with said container having inwardly sloping side walls extending away from said mouth and into the mouth of an adjacent container in the stack, a generally rectangular paperboard ring attached to said flange and having two pairs of elongated parallel side portions, and an elongated paperboard flap integrally formed with each of said side portions of each of said pairs with each of said flaps joined to said ring at a fold line adjacent to said mouth and extending along substantially the full length of said side portion of said ring rendering said side portion of said ring substantially rigid, and with each of said flaps extending along one of said sloping side walls in a direction away from said flange by a distance sufficient to engage the flange of said adjacent container in the mouth of which said container is nested.

2. An easily denestable stack of containers which comprises a stack of a plurality of generally rectangular plastic container bodies each defining a cavity therein for the receipt of food with a generally rectangular mouth surrounding by an outwardly extending flange with said containers having inwardly sloping sidewalls extending away from their mouths and into the mouths of the containers below them in said stack, a generally rectangular paperboard ring underlying and attached to said flange on each of said bodies, and a plurality of paperboard flaps carried by each of said rings and extending downwardly from said ring into engagement with the container body in said stack below the container body on which said ring is mounted.

References Cited in the file of this patent
UNITED STATES PATENTS

| | | |
|---|---|---|
| 2,120,826 | Young | June 14, 1938 |
| 2,750,294 | Peters | June 12, 1956 |
| 2,759,656 | Abrams | Aug. 21, 1956 |
| 2,938,801 | Seiferth et al. | May 31, 1960 |